United States Patent [19]

Boudrot et al.

[11] 4,276,361
[45] Jun. 30, 1981

[54] ELECTROCHEMICAL CELL WITH ELECTRODE HOLD-DOWN

[75] Inventors: Robert J. Boudrot, Falmouth; John S. Shambaugh, Holliston; Hyman Zeltzer, Needham, all of Mass.

[73] Assignee: GTE Products Corporation, Stamford, Conn.

[21] Appl. No.: 163,242

[22] Filed: Jun. 26, 1980

[51] Int. Cl.³ .............................................. H01M 2/10
[52] U.S. Cl. ..................................... 429/186; 429/208
[58] Field of Search ........................ 429/105, 186, 208

[56] References Cited

U.S. PATENT DOCUMENTS

| 1,224,439 | 5/1917 | Bosson et al. | 429/186 |
|---|---|---|---|
| 4,086,397 | 4/1978 | Goebel et al. | 429/105 |
| 4,221,850 | 9/1980 | Attinger et al. | 429/186 |

FOREIGN PATENT DOCUMENTS 28734 of 1913 United Kingdom ...................... 429/186

*Primary Examiner*—Donald L. Walton
*Attorney, Agent, or Firm*—Peter Xiarhos

[57] ABSTRACT

A primary electrochemical cell including a hold-down unit for securing and preventing movement of a physically large battery stack of the cell. The battery stack is disposed within a rectangular metal housing of the cell, together with an electrolytic solution, and comprises a large number of rectangular anodes and cathode structures arranged in the battery stack in alternation.

The hold-down unit is disposed in the cell in abutment with the top of the battery stack and an inner surface of a cover assembly secured to the housing. The hold-down unit includes a pair of opposed end sections in abutment with the interior surfaces of one pair of walls of the housing and lying orthogonally to the planes of the components of the battery stack, and a pair of opposed connecting sections in abutment with the interior surfaces of the other pair of walls of the housing and interconnecting the pair of end sections. The connecting sections are spaced from the battery stack and define, together with the end sections, top and side openings. These openings, together with large openings in the end sections, minimize the displacement of electrolytic solution in the region of the cell above the battery stack. The connecting sections further include insulated, resilient, angularly-oriented tabs capable of deflection by contact with the top cover assembly for compensating for variations in tolerances associated with the manufacture and assembly of the components of the cell.

12 Claims, 3 Drawing Figures

ELECTROCHEMICAL CELL WITH ELECTRODE HOLD-DOWN

The invention herein described was made in the course of a contract with the Department of the Air Force.

BACKGROUND OF THE INVENTION

The present invention relates to an electrochemical cell and, more particularly, to a primary electrochemical cell including a hold-down unit for securing and preventing movement of a physically large battery stack of the cell.

Primary electrochemical cells are commonly available in a large assortment of sizes and shapes. One type of primary electrochemical cell which has been particularly successful, especially for high-current drain, low-temperature applications, is a so-called prismatic cell. Such a cell is generally described in U.S. Pat. No. 4,086,397, in the names of Franz Goebel and Nikola Marincic, and includes a physically large battery stack enclosed together with an electrolytic solution within a large, generally-rectangular metal housing. The battery stack as used within the cell comprises a large number of generally-rectangular cell components including a plurality of anodes, carbon cathode current collector electrodes, and insulative separators between the anodes and the carbon cathode current collector electrodes. Each anode generally comprises a large rectangular sheet of an oxidizable alkali metal, such as lithium, physically impressed into a supporting (e.g., nickel) grid, and each of the carbon cathode current collector electrodes comprises an aggregation of porous, semi-rigid carbon globules or conglomerates physically impressed into a metal (e.g., nickel) current collector grid. Each of the anodes and carbon cathode current collector electrodes further has a narrow rail around the periphery thereof and a tab connected to the rail for facilitating physical and electrical connection of the associated electrode to a corresponding terminal assembly. A common and preferred electrolytic solution employed in the cell as described above is a cathodelectrolyte solution comprising a reducible soluble cathode such as thionyl chloride and an electrolyte solute such as lithium tetrachloroaluminate dissolved in the thionyl chloride.

By the appropriate selection of the battery cell components, a cell as described above can be constructed to have any one of several possible sizes and energy configurations. A typical cell can, for example, have exterior dimensions of approximately 18 inch (height) $\times$ 13 inch (width) $\times$ 10 inch (depth), a weight of 156 pounds, an ampere-hour capacity rating of 10,000 ampere-hours, and a nominal discharge current of 40 amperes.

The cell as described hereinabove is generally operated in an undisturbed, vertical, upright position. However, in actual practice, it is possible for the cell to be moved or transported from one place to another, to be turned upside down or on its side, and/or to be exposed to vibration, shock, or other physically abusive or unsettling conditions. In any of these situations, it is possible for the battery stack or components thereof to be disturbed or displaced from their initial or operating position. If the disturbance of the battery stack or components thereof is substantial, undesirable short-circuit conditions can occur which, considering the very high-energy, high-current characteristics of the cell, can lead to severe physical damage to the cell.

BRIEF SUMMARY OF THE INVENTION

In accordance with the present invention, an electrochemical cell is provided which is particularly suitable for use in situations as described hereinabove. The cell in accordance with the invention includes a rectangular battery stack disposed within a rectangular housing and in contact with an electrolytic solution also present within the housing. The battery stack comprises a plurality of rectangular cell components lying within corresponding planes. A top cover assembly is secured to the housing above the battery stack. A generally-rectangular hold-down unit in accordance with the invention is located intermediate to the battery stack and the top cover assembly and in abutment with the battery stack and an inner surface of the top cover assembly.

The hold-down unit in accordance with the invention includes first and second opposed end sections disposed on the battery stack across the planes of the cell components thereof, and first and second opposed connecting sections spaced from the battery stack and interconnecting the first and second end sections. The first and second end sections and the first and second connecting sections define a top opening adjacent to the inner surface of the top cover assembly and side openings adjacent to walls of the housing. The first and second end sections further have openings therein which, together with the aforesaid top and side openings, serve to minimize the displacement of electrolytic solution in the region of the housing above the battery stack. The hold-down unit in accordance with the invention further includes contact portions associated with one of the pairs of sections in abutment with the inner surface of the top cover assembly. In a preferred form, the contact portions include a pair of resilient, angularly-oriented tabs located in said one of the pairs of sections and capable of deflection by contact with the inner surface of the top cover assembly. This deflection serves to compensate for variations in tolerances associated with the manufacture and assembly of the components of the cell.

BRIEF DESCRIPTION OF THE DRAWING

Various objects, features and advantages of an electrochemical cell in accordance with the present invention will be apparent from a detailed discussion taken in conjunction with the accompanying drawing in which.

DETAILED DESCRIPTION OF THE INVENTION

Figure 3:
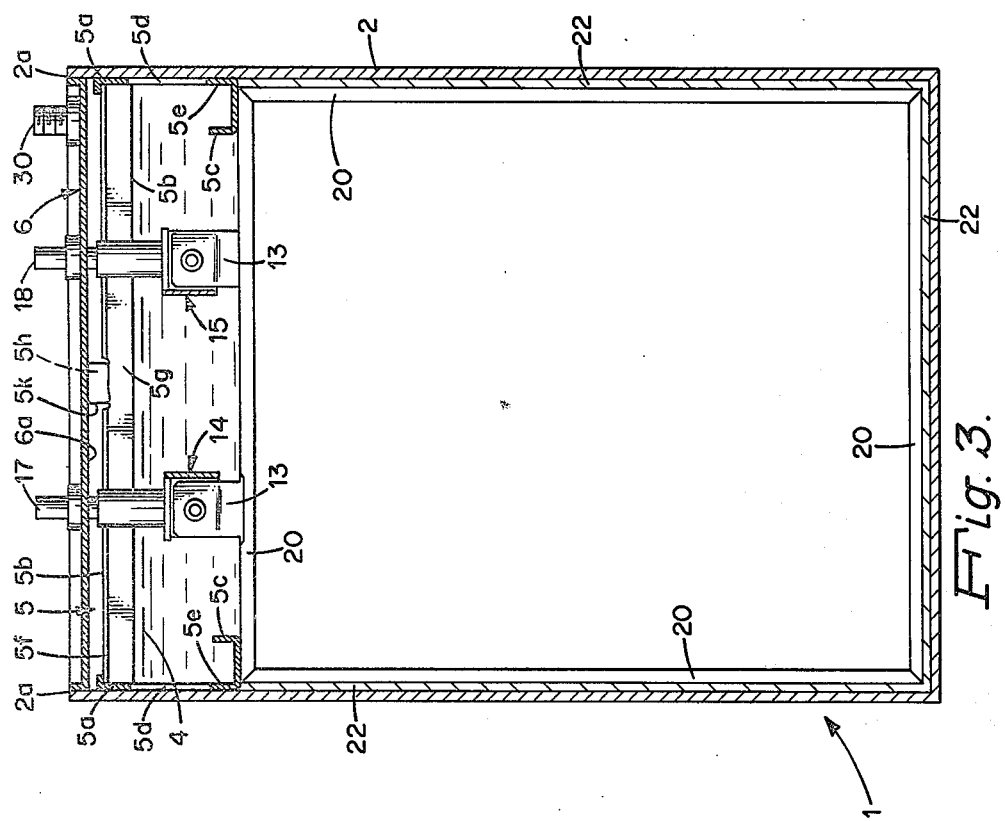
FIG. 3 is a cross-sectional view of the electrochemical cell of FIG. 1, taken along the line 3—3 in FIG. 1.
Figure 1:
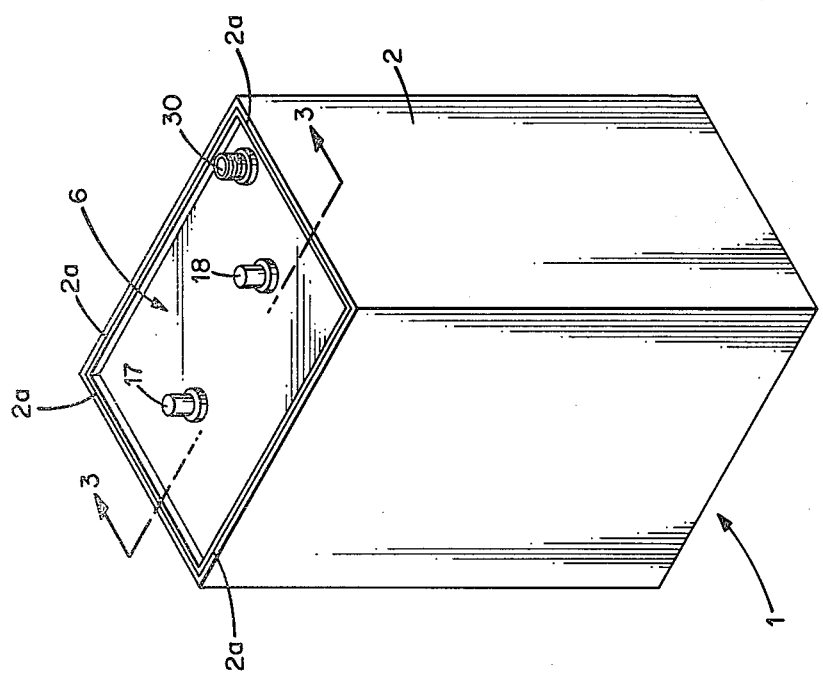
FIG. 1 is a perspective view of a primary electrochemical cell in accordance with the present invention.
Figure 2:
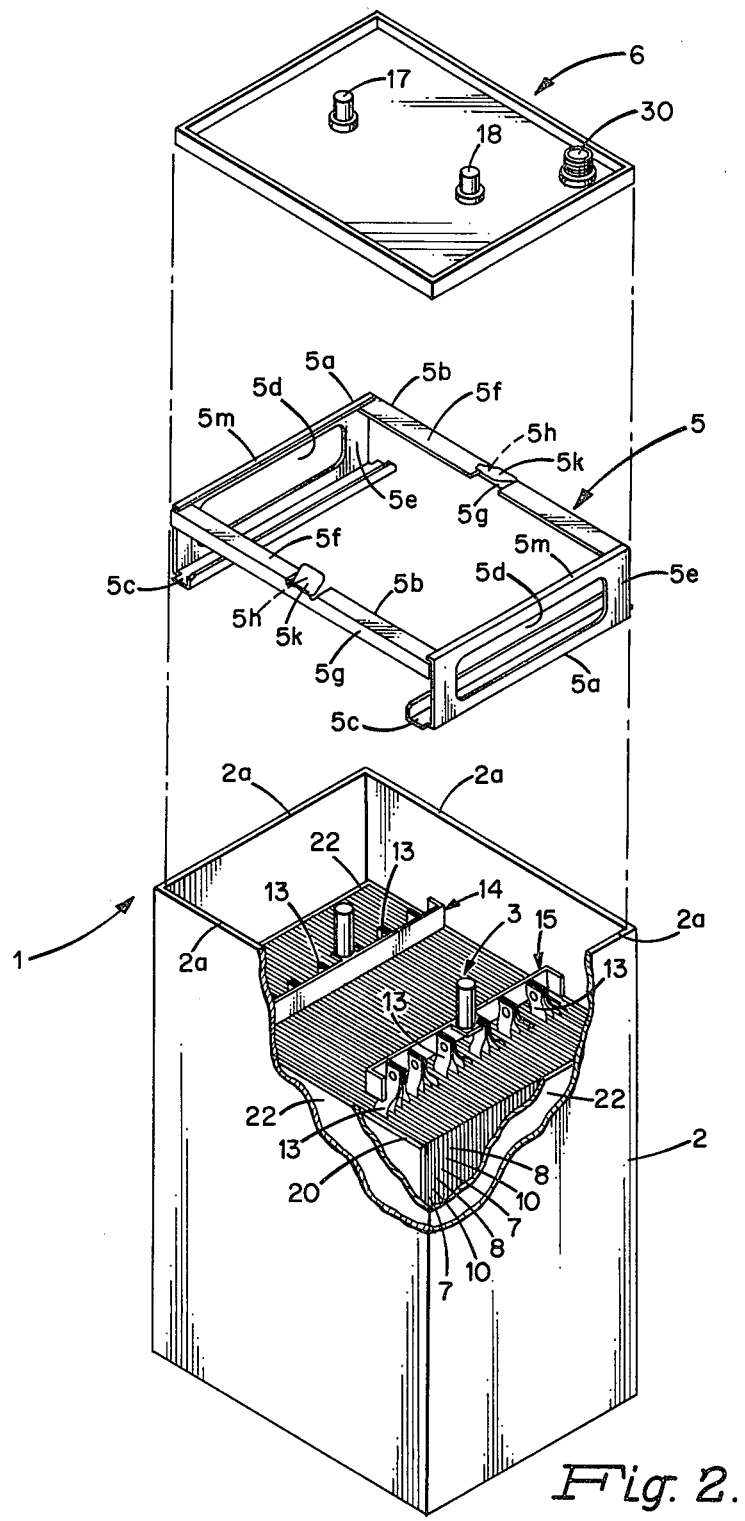
FIG. 2 is an exploded perspective view, partly broken away, illustrating various components of the electrochemical cell of FIG. 1.

Referring now to FIGS. 1–3, there is shown a primary electrochemical cell 1 in accordance with the present invention. As shown in FIGS. 1–3, the electrochemical cell generally comprises a rectangular housing 2, a battery stack 3 disposed within the housing 2, an electrolytic solution 4 (FIG. 3) in contact with the battery stack 3, a hold-down unit 5, and a top cover assembly 6. The housing 2 may be of stainless steel of 0.078 inch thickness and have typical outer dimensions of approximately 18 inch (height)×13 inch (width)×10 inch (depth). The battery stack 3 as employed within the housing 2 comprises a large number of generally-rectangular cell components. These components include a plurality of anodes 7, carbon cathode current collector electrodes 8, and insulative separators 10 between the anodes 7 and the carbon cathode current collector electrodes 8. Although not specifically shown in the drawing, in a preferred form and construction of the battery stack 3, each of the anodes 7 comprise a large rectangular sheet of an oxidizable alkali metal, such as lithium, pressed into a supporting metal (e.g., nickel) grid, and each of the carbon cathode current collector electrodes 8 comprises an aggregation of porous semi-rigid carbon globules or conglomerates pressed into a metal (e.g., nickel) grid to be supported thereby. The grids of the electrodes 8 also serve as a current collector member for the cell during the discharge cycle of the cell 1. The separators 10, which serve to electrically isolate the anodes 7 from the carbon cathode current collector electrodes 8, may be of a suitable insulative material such as fiberglass. The anodes 7 and the carbon cathode current collector electrodes 8 as described hereinabove further have narrow portions or rails at the peripheries thereof from which tabs 13 extend for facilitating the physical and electrical connection of the anodes 7 and the carbon cathode current collector electrodes 8 to corresponding metal (e.g., nickel) bus bar assemblies 14 and 15, respectively. The assemblies 14 and 15 are in turn physically and electrically connected to a pair of metal (e.g., nickel) terminals 17 and 18, respectively, located in, and insulated from, the top cover assembly 6. The peripheral metal portions are further covered by insulator members 20, as indicated in FIGS. 2 and 3, which may take the form of channels of U-shaped cross-section. The channels 20 are used for electrically isolating the components of the battery stack 3 from each other and from the hold-down unit 5 as will be discussed in greater detail hereinafter. A suitable material for the channel members 20 is "Halar" (ethylene chlorotrifluoroethylene, or ECFE). Typical dimensions for the battery stack 3 as described hereinabove, corresponding to a total of 47 anodes and cathode electrodes, are approximately 14.5 inch (height)×12.8 inch (width)×9.8 inch (depth). The electrolytic solution 4 to which the battery stack 3 is exposed and which is compatible with the cell components as described hereinabove is preferably a cathodelectrolyte solution comprising a reducible soluble cathode such as thionyl chloride and an electrolyte solute such as lithium tetrachloroaluminate dissolved in the thionyl chloride.

In the electrochemical cell 1 as described hereinabove, it is important that the battery stack 3 be physically restrained within the housing 2 so that the battery stack 3 does not move out of position as a result of changes in the physical orientation of the cell, movement or transport of the cell, or exposure of the cell to a variety of disturbing conditions such as vibration, shock, etc. This restraint of the battery stack 3 is accomplished in accordance with the present invention by means of the aforementioned hold-down unit 5. This unit, which may be of stainless steel of a thickness of 0.060 inch, is interposed between the top of the battery stack 3 and an inner surface 6a of the top cover assembly 6, as most clearly indicated in FIG. 3, and serves to hold the battery stack 3 firmly in position while at the same time distributing and dissipating external forces such as vibration and shock in such a fashion as to prevent or minimize physical damage to the battery stack 3. In addition, the hold-down unit 5 allows adjustments to be made to compensate for minor, normal variations in tolerances associated with manufacturing and assembly operations. The open nature of the hold-down unit 5, together with a minimal use of metal, further results in a minimal displacement of the electrolytic solution in the region or space intermediate to the battery stack 3 and the inner surface 6a of the top cover assembly 6. The hold-down unit 5 as described above may also be molded from a suitable plastic material.

As best shown in FIG. 2, the hold-down unit 5 generally comprises a pair of opposed, generally-rectangular end sections 5a interconnected at upper corners thereof by means of a pair of generally L-shaped connecting sections 5b. The sections 5b are parallel to each other and extend orthogonally between the end sections 5a. The sections 5b may be connected to the end sections 5a in any suitable manner, for example, by welding. Each of the end sections 5a is turned upwardly and inwardly at its bottom end to define a generally U-shaped channel portion 5c and further includes a large opening 5d in a generally-rectangular vertical wall 5e thereof. The U-shaped channel portions 5c eliminate any sharp edges which might otherwise exist and possibly cut through the U-shaped insulator members 20 covering the metal peripheral edges or rails of the cell electrodes and cause undesirable short circuit conditions. The openings 5d in the walls 5e of the end sections 5a serve, together with the otherwise open nature of the unit 5, to minimize the displacement of the electrolytic solution in the region above the battery stack 2. The openings 5d are made as large as possible without impairing the structural integrity of the hold-down unit 5.

Each of the sections 5b interconnecting the end sections 5a comprises a flat, horizontal portion 5f, and a flat, vertical portion 5g orthogonal to and integral with the portion 5f. The portion 5f has a rectangular-shaped, resilient, deflective tab 5h cut out therefrom and bent upwardly at an acute angle with respect to the plane of the portion 5f, for example, at an acute angle of about 15°. This angle is selected so that the height of the tab 5h relative to the plane of the horizontal portion 5f is sufficient to compensate for minor, normal manufacturing and assembly tolerances, as will be discussed more fully hereinafter. Each of the tabs 5h further has an insulative sheath 5k disposed therearound, for example, of "Teflon" (tetrafluoroethylene fluorocarbon polymers and fluorinated ethylene-propylene resins). The sheaths 5k physically and electrically isolate the tabs 5h from the metal top cover assembly 6. Although not shown in the drawing, as a variation of the above tab design, tabs can alternatively be formed or secured to top portions 5m of the end sections 5a instead of the sections 5b.

The overall dimensions for the hold-down unit 5 as discussed hereinabove, as well as the dimensions of the battery stack 3 and the housing 2, are selected so that the hold-down unit 5 and the battery stack 3 fit snugly within the housing 2 of the cell 1. As indicated in FIG. 3 of the drawing, the battery stack 3 is electrically isolated from the bottom wall of the housing 2 and the four side walls of the housing 2 by means of sheets 22 of a suitable insulating material. The hold-down unit 5 rests directly on top of the battery stack 3, orthogonal to the planes of the stack components, with the end sections 5a and the sections 5b abutting against the inner surfaces of the four side walls of the housing 2 and providing "bracing" for these walls. As indicated in FIG. 3, the bus bar assemblies 14 and 15 are located in a non-interfering manner intermediate to the end sections 5a and the sections 5b, specifically, in the space above the battery stack 3. The top and side openings of the hold-down unit 5 defined by the end sections 5a and the sections 5b as described hereinabove minimizes, in conjunction with the aforementioned openings 5d, the displacement of electrolytic solution in the space intermediate to the battery stack 3 and the inner surface 6a of the top cover assembly 6.

With the battery stack 3 disposed within the housing 2 and the hold-down unit 5 resting on top of the battery stack 3, the assembly of the cell 1 is completed by securing the top cover assembly 6 to the housing 2. This step is accomplished by simply clamping the top cover assembly 6 to the housing 2 (by suitable apparatus, not shown) so that the cover assembly 6 abuts against the four walls of the housing 2, and then welding the top cover assembly 6 to the housing 2 at exposed top edges or surfaces 2a. As the assembly 6 is clamped to the housing 2, it is possible and likely for the resilient tabs 5h of the sections 5b to be deflected or compressed downwardly slightly to compensate for normal variations in tolerances associated with the manufacture and assembly of the various components of the cell. The downward deflection of the resilient tabs 5h occurs until, as indicated hereinabove, the top cover assembly 6 abuts against the walls of the housing adjacent to the exposed top edges or surfaces 2a. It will be noted that the U-shaped channels 5c of the end sections 5a prevent any penetration or cutting of the channel members 20 during the abovedescribed clamping operation.

Once the assembly of the cell 1 has been completed, including the introduction into the housing 2 of the electrolytic solution 4 by way of a standard inlet valve 30 in the top cover assembly 6, the cell 1 can be moved or transported freely about or turned on its side or upside down without fear of physical displacement of the battery stack 3. In addition, by virtue of the symmetry of the hold-down unit 5 and its effect of "bracing" the top of the housing 2, various forces to which the cell might be exposed, such as shock or vibration, can be absorbed or dissipated evenly by the hold-down unit 5 and the housing 2 (including the resilient, deflective tabs 5h of the hold-down unit 5) so as to prevent or minimize physical damage to the battery stack 3. By way of example, in one test situation, an electrochemical cell having a hold-down unit as described hereinabove and having a weight of about 156 pounds was dropped, top down, onto a concrete floor from a height of 27 feet without incurring detectable damage to the battery stack therein.

While there has been described what is considered to be a preferred embodiment of the invention, it will be apparent to those skilled in the art that various changes and modifications may be made therein without departing from the invention as called for in the appended claims.

What is claimed is:

1. An electrochemical cell comprising:
   a rectangular housing having a plurality of walls;
   a rectangular battery stack disposed within the housing and comprising a plurality of rectangular cell components lying within corresponding planes;
   a top cover assembly secured to the housing above the battery stack and having an inner surface;
   an electrolytic solution within the housing in contact with the battery stack; and
   a generally-rectangular hold-down unit intermediate to the battery stack and the top cover assembly and in abutment with the battery stack and the top cover assembly, said hold-down unit comprising:
   first and second opposed end sections disposed on the battery stack across the planes of the cell components thereof; and
   first and second opposed connecting sections spaced from the battery stack and interconnecting the first and second end sections, said first and second end sections and said first and second connecting sections defining a top opening adjacent to the inner surface of the top cover assembly and side openings adjacent to walls of the housing, and said first and second end sections further having openings therein for minimizing, together with the aforesaid top and side openings, the displacement of electrolytic solution in the region of the housing above the battery stack;
   one of said pairs of sections further including contact portions in abutment with the inner surface of the top cover assembly.

2. An electrochemical cell in accordance with claim 1 wherein:
   each of the cell components has an insulated peripheral top portion; and
   each of the first and second end sections of the hold-down unit has an upturned portion in abutment with the insulated peripheral top portions of the cell components of the battery stack and lying across the planes of the cell components.

3. An electrochemical cell in accordance with claim 2 wherein:
   the upturned portions are generally U-shaped and lie orthogonal to the planes of the cell components.

4. An electrochemical cell in accordance with claim 1 wherein:
   the rectangular housing includes first and second pairs of opposed walls each having an interior surface; and
   the first and second end sections and the first and second connecting sections of the hold-down unit are in abutment with the interior surface of the first and second pairs of walls, respectively, of the housing for bracing said housing.

5. An electrochemical cell in accordance with claim 4 wherein:
   each of the first and second end sections includes a generally-rectangular wall portion in abutment with the interior surface of a corresponding one of the first pair of walls of the housing and having a single opening therein for minimizing, together with the aforesaid top and side openings, the displacement of electrolytic solution in the region of the housing above the battery stack.

6. An electrochemical cell in accordance with claim 1 wherein:
   the contact portions of said one of the pairs of sections of the hold-down unit include a pair of resilient, angularly-oriented insulated tabs located in said one of the pairs of sections and capable of deflection by contact with the inner surface of the top cover assembly for compensating for variations in tolerances associated with the manufacture and assembly of the components of the cell.

7. An electrochemical cell in accordance with claim 6 wherein:
the insulated deflective tab portions are located in the first and second connecting sections of the hold-down unit.

8. An electrochemical cell in accordance with claim 7 wherein:
the rectangular housing includes first and second pairs of opposed walls each having an interior surface;
each of the cell components has an insulated top portion;
the first and second end sections and the first and second connecting sections of the hold-down unit are in abutment with the interior surfaces of the first and second pairs of walls, respectively, of the housing for bracing said housing, each of said first and second end sections having an upturned portion in abutment with the insulated top portions of the cell components of the battery stack and lying orthogonal to the planes of the cell components, each of said first and second end sections further having a generally-rectangular wall portion in abutment with the inner surface of a corresponding one of the first pair of walls of the housing and having a single opening therein for minimizing, together with the aforesaid top and side openings, the displacement of electrolytic solution in the region of the housing above the battery stack; and
each of said first and second connecting sections of the hold-down unit includes an insulated, resilient, angularly-oriented tab located therein capable of deflection by contact with the inner surface of the top cover assembly for compensating for variations in tolerances associated with the manufacture and assembly of the components of the cell.

9. An electrochemical cell in accordance with claim 8 wherein:
the upturned portions of the first and second end sections are generally U-shaped and face inwardly toward each other.

10. A primary electrochemical cell comprising:
a rectangular metal housing including first and second pairs of opposed rectangular walls each having an interior surface;
a rectangular battery stack disposed within the metal housing and comprising a plurality of rectangular anodes and cathode structures arranged in the battery stack in alternation and lying within corresponding planes, each of the anodes and cathode structures having an insulated peripheral top portion;
a top cover assembly secured to the housing and having an inner surface;
an electrolytic solution within the housing in contact with the battery stack; and
a generally-rectangular hold-down unit intermediate to the battery stack and the top cover assembly and in abutment with the battery stack, the interior surfaces of the first and second pairs of walls of the housing, and the inner surface of the top cover assembly, said hold-down unit comprising:
first and second opposed end sections comprising:
first and second opposed generally-rectangular wall portions in abutment with the interior surfaces of the first pair of walls of the housing and each having a single opening therein; and
first and second inwardly and upwardly turned, generally U-shaped, portions integral with the first and second rectangular wall portions, respectively, and in abutment with the insulated peripheral top portions of the anodes and cathode structures of the battery stack, said generally U-shaped portions lying orthogonal to the planes of the anodes and cathode structures; and
first and second opposed connecting sections in abutment with the interior surfaces of the second pair of walls of the housing and spaced from the battery stack, said connecting sections interconnecting the first and second end sections at the top corners of the generally-rectangular wall portions of the end sections and defining together with the first and second end sections a top opening adjacent to the inner surface of the top cover assembly and side openings adjacent to the interior surfaces of the second pair of walls of the housing for minimizing, together with the openings in the generally-rectangular wall portions of the end sections, the displacement of electrolytic solution in the region of the housing above the battery stack, each of said connecting sections further including an insulated resilient member capable of deflection by contact with the inner surface of the top cover assembly for compensating for variations in tolerances associated with the manufacture and assembly of the components of the cell.

11. A primary electrochemical cell in accordance with claim 10 wherein:
each of the first and second connecting sections is generally L-shaped in configuration and includes a vertical portion in abutment with the interior surface of a corresponding one of the second pair of walls of the housing, and a horizontal portion orthogonal to and integrated with the vertical portion, said horizontal portion including a resilient member in the form of a tab extending upwardly at an acute angle with respect to the plane of the horizontal portion and including an insulating member therearound for insulating said tab from the inner surface of the top cover assembly.

12. A primary electrochemical cell in accordance with claim 11 further comprising:
first and second terminal assemblies disposed in the space intermediate to the first and second end sections and the first and second connecting sections of the hold-down unit and interconnected with the anodes and cathode structures, respectively.

* * * * *